US012732439B2

(12) United States Patent
Srivastava et al.

(10) Patent No.: US 12,732,439 B2
(45) Date of Patent: Sep. 8, 2026

(54) COMMUNICATION REFINEMENT USING JOINT MIXED INTEGER PROGRAMMING AND LINEAR PROGRAMMING

(71) Applicant: Intuit Inc., Mountain View, CA (US)

(72) Inventors: Ashok Srivastava, Mountain View, CA (US); Sricharan Kallur Palli Kumar, Milpitas, CA (US); Rania Succar, Menlo Park, CA (US); Jack Tam, Laguna Niguel, CA (US); Yan Qu, Los Altos, CA (US); Nhung Ho, Redwood City, CA (US); Taylor Horton, Atlanta, GA (US); Shivang Bhadresh Shah, Pleasanton, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/005,196

(22) Filed: Dec. 30, 2024

(65) Prior Publication Data

US 2026/0189484 A1 Jul. 2, 2026

(51) Int. Cl.

| | |
|---|---|
| ***H04L 43/02*** | (2022.01) |
| ***H04L 43/04*** | (2022.01) |
| ***H04L 47/22*** | (2022.01) |
| ***H04L 47/2425*** | (2022.01) |
| ***H04L 47/56*** | (2022.01) |
| *G05B 23/02* | (2006.01) |

(52) U.S. Cl.

CPC .............. *H04L 43/02* (2013.01); *H04L 43/04* (2013.01); *H04L 47/22* (2013.01); *H04L 47/2433* (2013.01); *H04L 47/56* (2013.01); *G05B 23/0297* (2013.01)

(58) Field of Classification Search

CPC ................................ H04L 43/02; H04L 43/04

See application file for complete search history.

(56) References Cited

FOREIGN PATENT DOCUMENTS

| | | | | |
|---|---|---|---|---|
| CN | 110073301 | * | 7/2019 | G05B 23/0297 |
| CN | 118474039 | * | 8/2024 | H04L 47/56 |

* cited by examiner

*Primary Examiner* — Barbara B Anyan

(74) *Attorney, Agent, or Firm* — Dinsmore & Shohl LLP

(57) ABSTRACT

Aspects of the disclosure provide techniques for defining communication parameters. A method includes obtaining input information relating to a communication source and a set of communication targets; generating, in accordance with a target function that indicates a set of constraints to be satisfied by a set of communication parameters, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on a predictive model configured to predict a behavior of the set of communication targets; and providing the set of communication parameters.

20 Claims, 7 Drawing Sheets

COMMUNICATION REFINEMENT USING JOINT MIXED INTEGER PROGRAMMING AND LINEAR PROGRAMMING

BACKGROUND

Field

Aspects of the present disclosure relate to intelligent systems and machine learning platforms, particularly to methods and systems for automating and enhancing experimentation processes.

Description of Related Art

Effective communication strategies are beneficial for achieving desired outcomes in various domains. A communication strategy may define content of communications, communication targets (e.g., recipients for the communications), and how often to perform a communication, with the goal of improving an interaction rate or other metric associated with the communication targets. These may be challenging parameters to select or refine. For example, while it is generally beneficial to be in frequent contact with a communication target, it may be counterproductive to perform communications with a given communication target too often.

SUMMARY

Certain aspects provide a method of defining communication parameters by a device. The method includes obtaining input information relating to a communication source and a set of communication targets; generating, in accordance with a target function that indicates a set of constraints to be satisfied by a set of communication parameters, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on a predictive model configured to predict a behavior of the set of communication targets; and providing the set of communication parameters.

Certain aspects provide a method of defining communication parameters by a device. The method includes obtaining input information relating to a communication source and a set of communication targets; generating a target function that indicates a set of constraints to be satisfied by the set of communication parameters; dividing the set of communication targets into a plurality of groups of communication targets based on a predictive model configured to predict a behavior of the set of communication targets; generating, in accordance with the target function, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on the predictive model, and wherein the set of communication parameters is based on the plurality of groups of communication targets; and providing the set of communication parameters.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
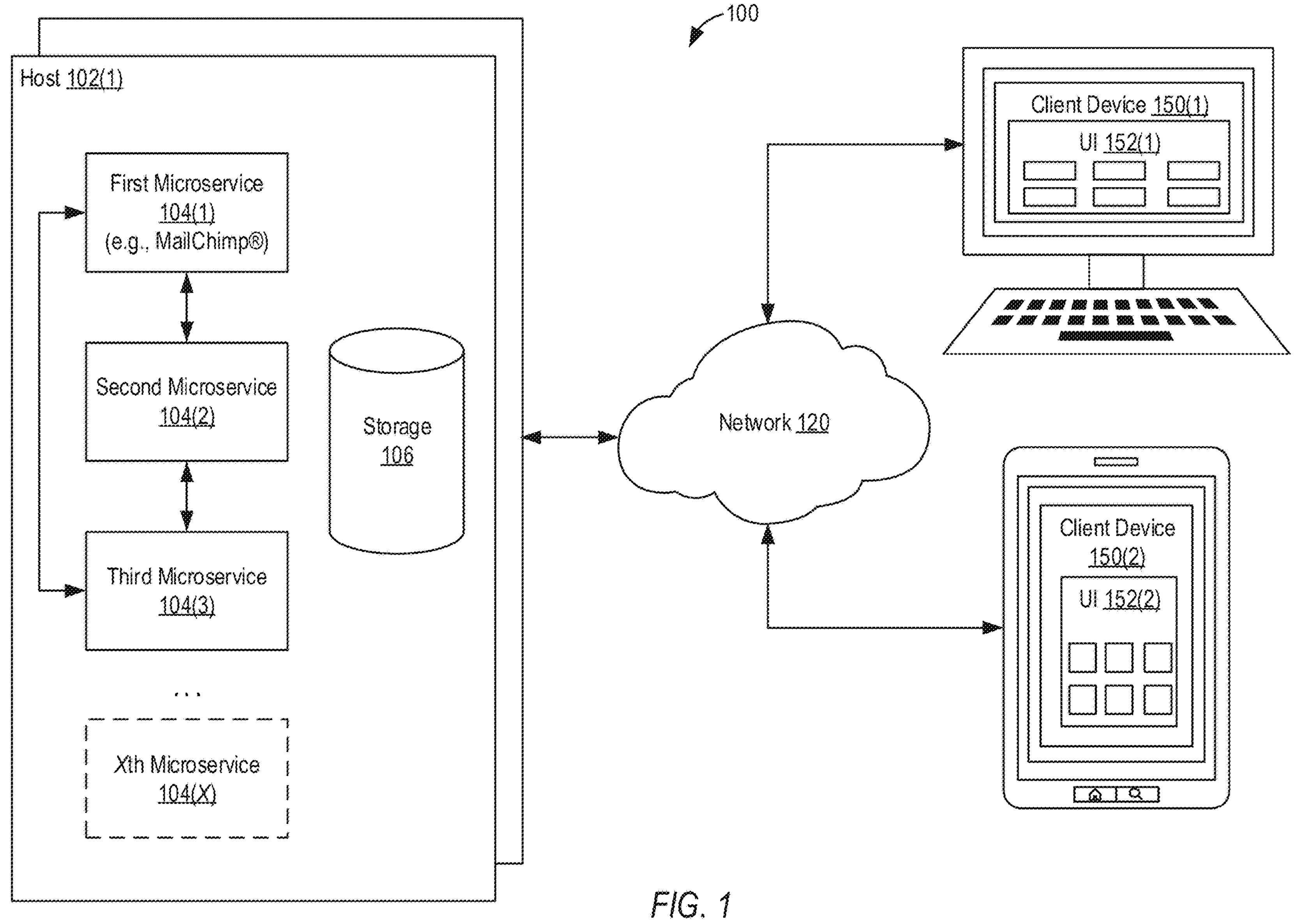
FIG. 1 depicts an example system supporting microservices.

Aspects of the present disclosure provide apparatuses, methods, processing systems, and computer-readable mediums for communication refinement using joint mixed integer programming and linear programming.

Effective communication strategies are beneficial for achieving desired outcomes in various domains. A communication strategy may define content of communications, communication targets (e.g., recipients for the communications), and how often to perform a communication, with the goal of improving an interaction rate or other metric associated with the communication targets. Traditional methods of defining communication strategies often involve manual processes that are time-consuming and may not yield optimal results given time inputs.

It may be attractive to automate determination of certain parameters for communication strategy creation, such as selection of targets for communications, generation of communications, selecting a number of communications to perform, or distributing the communications in time. However, some of these parameters may be difficult to determine (e.g., optimize), and not all parameters are suitable for determination (e.g., optimization) in the same fashion. For example, some parameters are discrete in nature (such as whether or not to contact a particular communication target, or the number of communications for a particular communication target), whereas other parameters are continuous in nature (such as the time at which communications are to be sent, or an allocation of a continuous parameter such as a budget to various channels). Furthermore, even if acceptable values can be selected for a combination of discrete parameters and continuous parameters, the generation of communication content is unsuitable for optimization as a discrete or continuous parameter, and some systems for generation of communication content may not dynamically adapt to real-time data and evolving behaviors, limiting their effectiveness in maximizing engagement and desired outcomes. Still further, solutions for discrete and/or continuous variable parameters may fail to take into account information outside of the set of constraints and solution space of the discrete and/or continuous variable parameters, such as past behaviors of communication targets, past interaction rates associated with certain communications, or the like. Thus, technical problems with communication strategy generation include suboptimal solution of complex problems involving a combination of discrete parameters and continuous parameters, and difficulty in refining the combination of discrete parameters and continuous parameters in view of information such as historical information regarding past behaviors, past interaction rates, relationships associated with communication targets, or customer segmentation. For example, even if discrete parameters and continuous parameters are determined, deployment of these parameters without refinement based on the above-described information may lead to inefficient deployment of processing and communication resources, low interaction rates, or the like.

The disclosed method provide technical solutions for these technical problems and others by integrating mixed-integer programming, linear programming, and AI techniques (such as an AI or machine learning (ML) model) to generate and refine communication parameters for a set of communication targets. For example, aspects described herein provide determination of a set of communication parameters that include continuous-variable communication parameters (that is, communication parameters whose values are defined by a value of a continuous variable) and discrete-variable communication parameters (that is, communication parameters whose values are defined by a value constrained to be an integer). These determinations are performed by a linear programming module and a mixed-integer programming module, respectively, which reduces processing resource consumption relative to determining these communication parameters without sensitivity to whether the communication parameters are continuous in nature or discrete in nature. Thus, integrated determination (e.g., optimization) of both discrete and continuous communication parameters is achieved using mixed-integer and linear programming modules.

After determining the set of communication parameters, aspects described herein provide for the set of communication parameters to be refined (or for new communication parameters to be generated based on the determined set of communication parameters) using an AI/ML model and based on information such as historical information and behavioral data. This refinement or generation of communication parameters increases responsiveness of the communication parameters to characteristics of communication targets, which improves efficiency and effectiveness of communications with the communication targets and thereby reduces processing resource consumption. Further, aspects described herein enable the refinement (e.g., maximization) of engagement rates and refinement (e.g., minimization) of the volume of communications sent, and ensures interactions are effective. By leveraging input information and AI/ML models, aspects described herein dynamically personalize content and improve the timing and frequency of communications, aligning interactions with desired outcomes to enhance overall efficiency.

Example System Implementing Mixed-Integer Programming and Linear Programming for Communication Generation FIG. 1 depicts an example system 100 supporting microservices 104 (e.g., software-defined service, which in some cases, may be cloud-native). As shown in FIG. 1, system 100 comprises client devices 150(1)-(2) (collectively referred to herein as "client devices 150") and host(s) 102 interconnected through a network 120. Network 120 may be, for example, a direct link, a local area network (LAN), a wide area network (WAN), such as the Internet, another type of network, or a combination of one or more of these networks.

Host(s) 102 may be geographically co-located servers on the same rack or on different racks in any arbitrary location in a data center. Host(s) 102 may be constructed on a server grade hardware platform and include components of a computing device such as, one or more processors (central processing units (CPUs)), one or more memories (random access memory (RAM)), one or more network interfaces (e.g., physical network interfaces (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1), a second microservice 104(2), and/or through an X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain embodiments, the first microservice 104(1) implements an information service, which is any network 120 accessible service that maintains financial data, medical data, personal identification data, and/or other data types. For example, the information service may include MailChimp® and its variants made commercially available by Intuit® of Mountain View, California. In certain embodiments, the first microservice 104(1)

implements one or more language models, such as LLM(s). First microservice 104(1) may implement language model(s) to provide responses to user prompts, including responses such as answers, advice, and/or help with the preparation of documents and/or reports. For example, TurboTax®, an example information service, may utilize a language model to aid users of the application with preparing one or more financial documents. Language model may provide answers to questions asked by a user of the application, prepare and output one or more reports and/or documents for the user, etc.

In certain embodiments, the language model(s) may be fine-tuned for one or more specific domains. Fine-tuning language model(s) for specific domains may involve adapting a pre-trained language model to generate domain-specific text and/or initiate or perform domain-specific tasks. For example, a language model 08 implemented via MailChimp® (an example information service) may be fine-tuned to generate communications that are based on historical information, such as past user interactions, customer profiles, information regarding customers of customers, or the like, such that an interaction rate or success rate of such communications is improved. The language model may be fine-tuned to perform this specific task using information from past user interactions, user profiles, or instructions from customers, among others.

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other embodiments may include more or less hosts 102 and/or client devices 150, and client devices 150 may use any combination of microservices 104 on any host 102 where microservices 104 are deployed.

Figure 2:
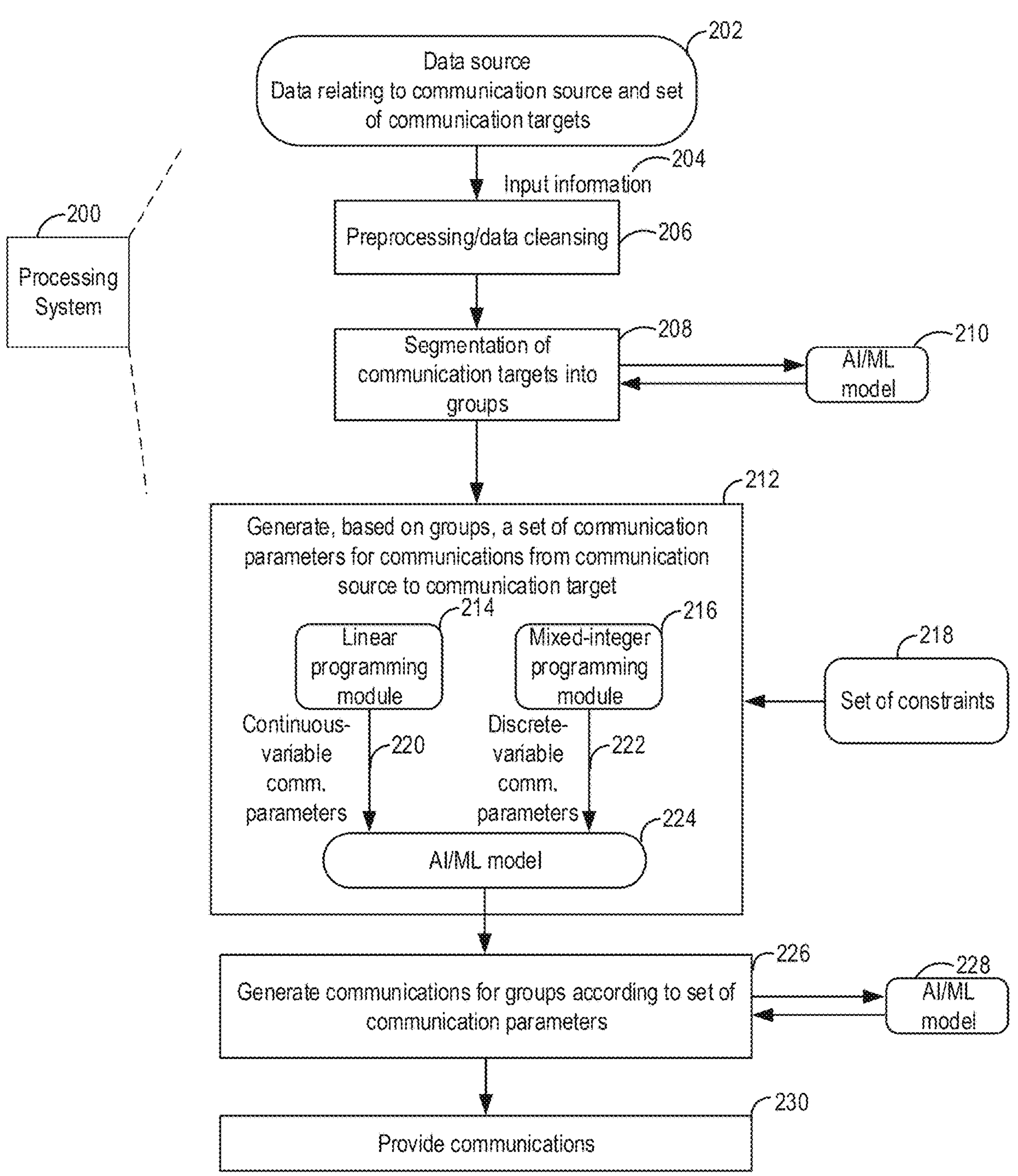
FIG. 2 is a diagram illustrating an example of generation of a communication strategy based on mixed-integer programming and linear programming.

FIG. 2 is a diagram illustrating an example of generation of a communication strategy based on mixed-integer programming and linear programming. The operations of FIG. 2 may be performed by a processing system 200. Processing system 200 may be an example of one or more microservices 104 or processing system 700 of FIG. 7.

As shown, the processing system 200 obtains input information 204 relating to a communication source and a set of communication targets from a data source 202. This input information 204 can include a variety of data types. For example, input information 204 may include user input regarding a set of communications or a campaign, data regarding communication sources for communication generation (referred to herein as "C1s"), data regarding communication targets, or the like. In some aspects, input information 204 identifies one or more constraints of a set of constraints 218. In some aspects, the communication targets may be customers of the communication sources, and may be referred to as C2s. The data source 202 may include, for example, storage 106, a user interface, a chat bot, or the like. In some aspects, the data source 202 may include information regarding past transactions, such as information derived from past communications to a set of communication targets.

In some aspects, the input information 204 includes user input. User input may include information input or selected by a user (e.g., a user of client device 150). User input may include information regarding objectives of a communication, a target audience (e.g., desired communication targets), budget constraints, desired outcomes, constraints of a set of constraints 218 for mixed-integer programming or linear programming, or the like.

In some aspects, the input information 204 includes data regarding customers (e.g., communication sources and/or communication targets). Data regarding communication sources and/or communication targets (such as C1s or C2s) may include information regarding behaviors, preferences, and past interactions of customers (e.g., C1s) or communication targets (e.g., C2s). Customer data may include demographic information, purchase history, engagement metrics, or the like. In some aspects, the customer data may include information regarding relationships and interactions between different customer segments. In some aspects, the customer data may relate to a set of communication targets (e.g., C2s), a set of customers (e.g., C1s), or a combination thereof. This input information 204 allows the processing system 200 to generate communication parameters that are tailored to the specific needs and preferences of the target groups. By leveraging this input information, the processing system 200 can create more personalized and effective communication strategies, reducing processor and communication resource usage relative to sending untargeted, mass communications without fine-tuning via mixed-integer programming and linear programming.

At step 206, the processing system 200 optionally performs preprocessing and/or data cleansing of the input information 204 to obtain processed information. Step 206 includes data validation to check for errors and inconsistencies, data cleaning to correct errors and remove duplicates, and/or data transformation to convert the data into a suitable format for analysis. In some aspects, step 206 includes data integration, by which information from multiple sources is combined into a unified dataset. Step 206 provides for the input information 204 to be reliable and structured for efficient analysis and usage, thereby reducing processing resource usage and improving efficiency of communications.

At step 208, the processing system 200 includes segmenting (e.g., dividing) the communication targets into groups. For example, the processing system 200 may assign communication targets to one or more groups based on the input information 204 and AI/ML model 210. This segmentation may enable the tailoring communication strategies to different subsets of communication targets, thereby enhancing engagement and effectiveness and reducing processing and communication resource usage associated with untargeted or overly-broad communication transmission. In some aspects, the segmentation is performed using a clustering algorithm, such as k-means or hierarchical clustering. A clustering algorithm may group communication targets based on similarities in their behaviors, preferences, and other relevant attributes. Additionally or alternatively, classification algorithms, such as decision trees or support vector machines, can be used to assign communication targets to predefined groups based on characteristics of the communication targets. The choice of algorithm(s) may depend on the nature of the input information 204 and objectives of the communication strategy. By dividing the communication targets into groups, the processing system 200 allows for the creation of personalized communication parameters for each group. This targeted approach ensures that the content, timing, and frequency of communications are configured (e.g., optimized) for each segment, leading to higher engagement rates and more effective communication outcomes.

In some aspects, segmentation uses an AI/ML model 210. The AI/ML model 210 may be configured to predict behavior of the communication targets based on historical data (e.g., input information 204) and other relevant factors. The AI/ML model 210 processes various features of the input information 204, such as demographic information, past interactions, engagement metrics, and response rates, to determine the underlying similarities and differences among the communication targets. By applying clustering algorithms, such as k-means or hierarchical clustering, the AI/ML model 210 groups targets with similar characteristics into distinct segments. This segmentation allows for a more tailored approach to communication, as each group can be addressed with strategies that are specifically designed to be effective with attributes of each group.

Additionally, or alternatively, the AI/ML model 210 can utilize classification algorithms, such as decision trees or support vector machines, to assign communication targets to predefined groups based on their predicted behaviors or other attributes. These algorithms analyze the input data to identify factors that influence target responses and use this information to classify communication targets into relevant segments. By segmenting the communication targets, the AI/ML model 210 enables the creation of personalized communication parameters for each group. Thus, the content, timing, and frequency of communications can be configured to conserve processing and communication resource utilization, and to provide improved engagement and effectiveness.

At step 212, the processing system 200 generates, based on the groups, a set of communication parameters for communications from the communication source to the communication target. This step involves a linear programming module 214 for determination of continuous-variable communication parameters 220 (sometimes referred to herein as a first output of a linear programming operation) and a mixed-integer programming module 216 for determination of discrete-variable communication parameters 222 (sometimes referred to herein as a second output of a mixed-integer programming operation). The linear programming module 214 and the mixed-integer programming module 216 use a set of constraints 218, which are described in more detail in connection with FIG. 3. Determination of the set of communication parameters using the linear programming module 214 and the mixed-integer programming module 216 is described in more detail with respect to FIG. 3.

The processing system 200 refines the determined set of communication parameters 220 and 222 using AI/ML model 224. The AI/ML model 224 analyzes input information 204, such as past interaction or behavior data (e.g., information indicating interaction rates), customer data, or the like, to predict the behavior of the communication targets, which the AI/ML model 224 may use to generate or modify communication parameters in view of the input information 204. For example, by incorporating insights from historical data, the AI/ML model 224 adjusts the initial set of communication parameters 220 and 222, which include both continuous and discrete variables, to better align with the predicted behavior of the targets. By refining the communication parameters using the AI/ML model 224, the processing system 200 ensures that the final set of parameters is not only based on the initial set of constraints 218 and an target function (described in connection with FIG. 3), but also on data and predictive insights regarding communication targets. This step enhances the overall efficiency and effectiveness of communications generated using the communication parameters, leading to higher engagement rates and more successful outcomes. Furthermore, the integration of AI/ML model 224 allows for continuous improvement, as the AI/ML model 224 can be updated with new interaction data over time, further refining the communication parameters and adapting to changing behaviors and preferences of the communication targets. The refinement of AI/ML model 224 (as well as AI/ML model 210 and/or AI/ML model 228) is described in connection with FIG. 4.

At step 226, the processing system 200 generates communications for the groups according to the set of communication parameters. For example, the processing system 200 may use an AI/ML model 228 to generate the communications. At step 226, the processing system 200 generates communications for the groups of communication targets according to the refined set of communication parameters (that is, the output from step 212). Thus, the content, timing, and frequency of communications are tailored to specific needs and preferences of each group of communication targets.

The AI/ML model 228 receives as input various parameters, such as the communication parameters output at step 212, historical interaction data, and the predicted behavior of the targets, and generates communications (e.g., content) that align with the overall communication strategy. By incorporating the AI/ML model 228, the processing system 200 can produce personalized and contextually relevant communications that are effective with particular groups of communication targets, leading to higher engagement rates and more successful outcomes. Thus, the combination of the AI/ML model 228, the linear programming module 214, and the mixed-integer programming module 216 enable refinement (e.g., optimization) of communication parameters in both of a continuous fashion and a discrete fashion, and enable the refinement of the communication parameters based on context associated with the communication targets or groups of communication targets. Furthermore, the determination of communication parameters at step 212 and/or refinement of communication parameters using AI/ML model 224 or 228 can be performed in a dynamic fashion, with dynamic adjustments being made in view of new information. For example, the processing system 200 may determine a set of communication parameters according to a target function and a set of constraints, as described herein. The processing system 200 (for example, using AI/ML model 224 or another predictive model) may predict future behavior of the system, for example, by predicting a reaction of a communication target to a communication that is generated in accordance with the set of communication parameters. In each of multiple iterations, the processing system 200 may determine (e.g., optimize) a control action, such as a set of communication parameters determined using the mixed-integer programming 216 and the linear programming module 214, in accordance with (e.g., to maximize) the target function in view of the set of constraints. As new information (such as reactions of communications to communications) arrives, the processing system 200 may take this new information into account, for example, by updating constraints, a target function, or AI/ML model 224/228 (as described in connection with FIG. 4).

At step 230, the processing system 200 provides the communications. For example, the processing system 200 can send the communications. As another example, the processing system 200 can provide the communications to be sent by a communication system. As another example, the processing system 200 may provide the generated and refined set of communication parameters to a user, and the user may trigger generation (at step 226) or transmission of communications according to the set of communication parameters.

The communications can include any form of communication. For example, the communications may include email messages. As another example, the communications may include text messages. As another example, the communications may include messages on a messaging application. As another example, the communications may include notifications from an app. As another example, the communications may include social media content. As another example, the communications may include voice assistant messages or notifications. As another example, the communications may include communications or other interactions from a smart device.

Figure 3:
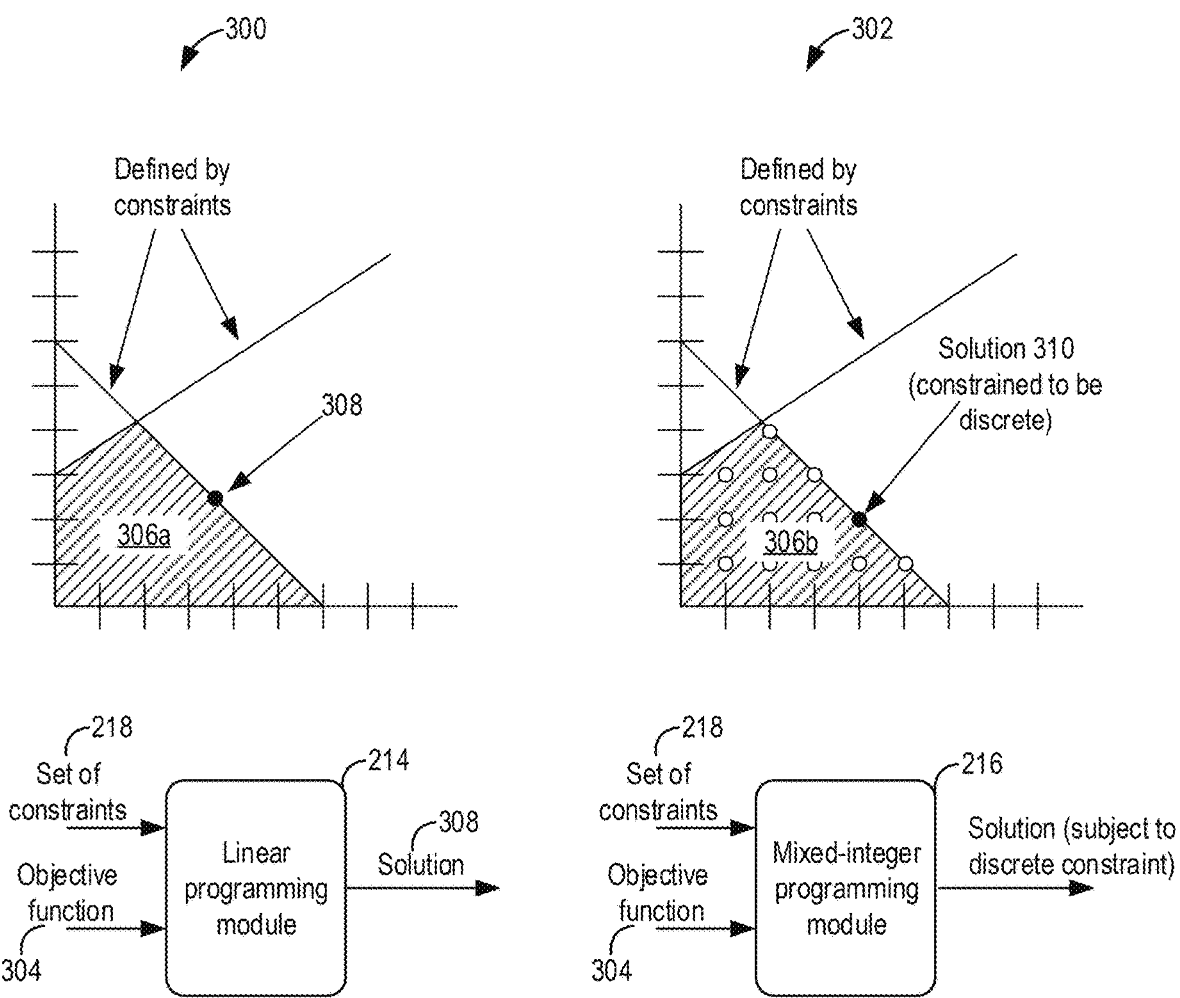
FIG. 3 is a diagram illustrating an example of linear programming and an example of mixed-integer programming in the context of generating communication parameters.

FIG. 3 is a diagram illustrating an example 300 of linear programming and an example 302 of mixed-integer programming in the context of generating communication parameters.

The operations of example 300 are performed by a linear programming module 214. The linear programming module 214 determines (e.g., optimizes) continuous-variable parameters based on a set of constraints 218 and a target function 304. The set of constraints 218 defines a feasible region 306 within which the solution must lie. The set of constraints 218 are implemented as linear inequalities or equations that bound the feasible region such that the solution adheres to practical and operational requirements. These constraints 218 can include various limitations such as budget information, a time window for sending communications, or the like. For example, a constraint 218 may indicate a permitted time parameter for a communication, a maximum number of communications per communication target, a minimum number of communications per communication target, or the like. Solutions in example 300 lie within the feasible region 306, meaning that the solutions adhere to the constraints 218. For example, these solutions may adhere to a budget indicated by budget information, may occur within a time window, may include up to the permitted number of communications per communication target, may include no less than the minimum number of communications per communication target, or the like.

The target function 304 is a mathematical expression that defines a goal of the processing. In the context of communication parameters, the target function could aim to maximize engagement rates, minimize the volume of communications sent, or optimize resource (e.g., processing resource or communication resource) allocation. The target function 304 may be a linear equation that combines different decision variables, each weighted by a coefficient. The coefficient of a decision variable may reflect the decision variable's importance in achieving the goal. In some aspects, the processing system 200 may determine a target function 304 and/or a set of constraints 218. For example, the processing system 200 may collect information (e.g., input information 204) that indicates maximum limitations, minimum limitations, relationships between input parameters and output parameters, or the like, and may generate a set of constraints 218 that confines a potential solution 308 or 310 in accordance with this information. As another example, the processing system 200 may collect information (e.g., input information 204) that indicates a goal of a communication parameter, a relationship between an input parameter and a communication parameter, or the like, and may generate a target function 304 for determination of a potential solution 308 or 310 in accordance with this information.

The linear programming module 214 processes the set of constraints 218 and the target function 304 to generate a solution 308, which may represent an optimal solution. This solution 308 represents the set of variables that meet the set of constraints 218 and maximize or minimize the target function 304 (according to the target function 304). The solution 308 is depicted in FIG. 3 as lying within the shaded feasible region 306 defined by the set of constraints 218. By leveraging linear programming, the processing system can efficiently determine continuous parameters, such as optimal timing of communications or resource allocation across communications or communication targets.

Now, mixed-integer programming is described. Mixed-integer programming differs from linear programming because, in mixed-integer programming, solutions 310 of the target function 304 are constrained to be discrete (e.g., integers). In some examples, solutions 310 may include a binary solution (e.g., having possible values of 1 or 0), such as when determining whether or not to send a communication.

The operations of example 302 are performed by a mixed-integer programming module 216. The mixed-integer programming module 216 is responsible for optimizing decision variables that include both continuous and discrete elements based on a set of constraints 218 and a target function 304. The set of constraints 218 defines the feasible region **306*b* within which a solution 310 must occur, similar to linear programming. In some aspects, a constraint 218 may indicate that potential solutions 310 are constrained to be integers. The target function 304** in mixed-integer programming is a mathematical expression that defines the goal of the optimization process, similar to linear programming.

The mixed-integer programming module 216 processes the set of constraints 218 and the target function 304 to generate a solution 310 (e.g., an optimal solution). The solution 310 is depicted in FIG. 3 as a black dot lying within the shaded feasible region **306*b* defined by the set of constraints 218, with potential solutions indicated by white dots (which all represent integer values). By leveraging mixed-integer programming, the processing system can determine discrete parameters for communication strategies. This approach allows for more precise control over decision variables, such as whether to send a communication or not, and the number of communications, leading to more efficient and effective communication strategies compared to linear programming alone. For example, by combining the linear programming module 214 and the mixed-integer programming module 216, a set of solutions can be found that indicate (1) to send a communication to a set of communication targets, (2) a number of communications to send to the set of communication targets, and (3) times at which to send the number of communications. A solution 308 or 310** may be referred to herein as a communication parameter.

These solutions 308/310 can then be fed into an AI/ML model 224, which can refine the solutions 308/310 or generate additional communication parameters based on the solutions 308/310. This is described in more detail in connection with FIG. 2.

Figure 4:
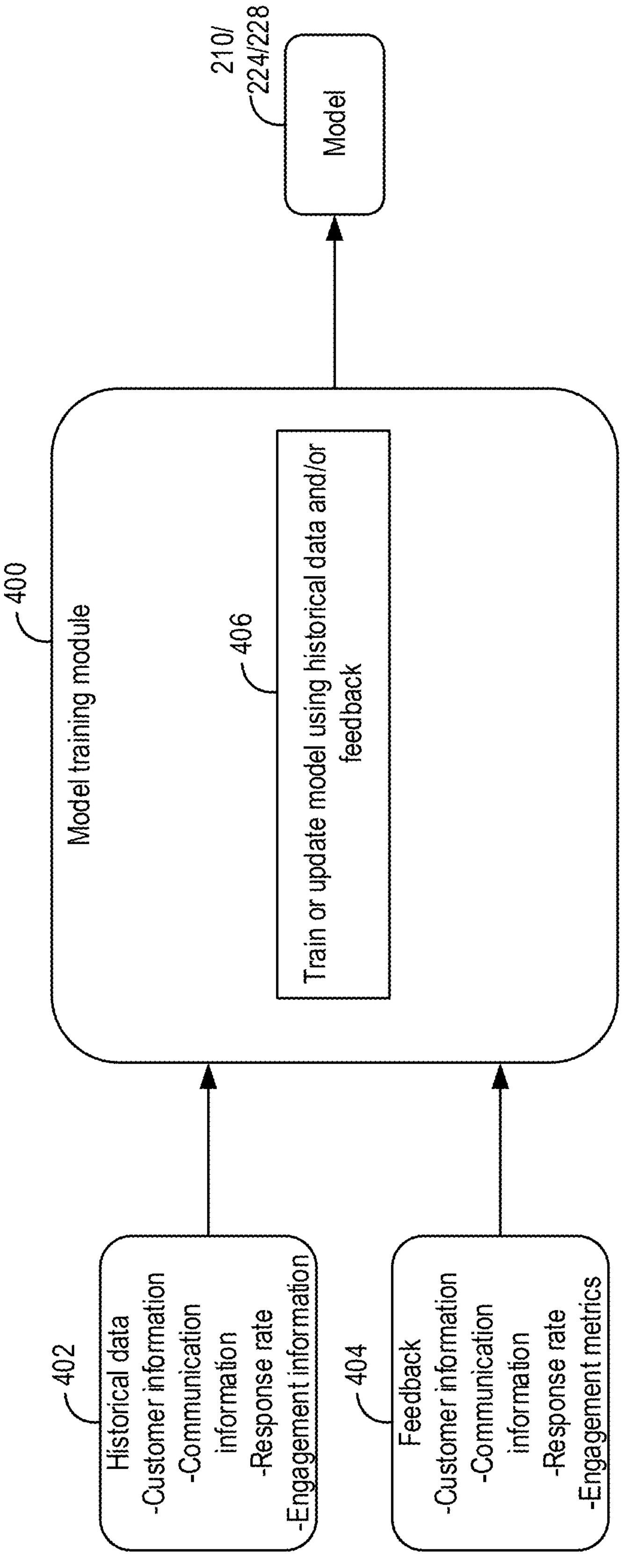
FIG. 4 illustrates the operations performed by a model training module.

FIG. 4 illustrates the operations performed by a model training module 400. The model training module 400 trains or updates an AI/ML model described herein, such as AI/ML model 210, AI/ML model 224, or AI/ML model 228. AI/ML model 210, AI/ML model 224, or AI/ML model 228 may be referred to herein as a predictive model. In this example, the model training module 400 receives two types of input data: historical data 402 and feedback 404.

The historical data 402 includes various types of information such as customer information, communication information, response rates, engagement metrics, or input information 204. Customer information may encompass demographic details, purchase history, and/or behavioral patterns, among other examples. Communication information includes details about past communications, such as the content, timing, and/or frequency of sent communications, among other examples. Response rates and engagement metrics provide insights into how the communication targets have interacted with previous communications.

The feedback 404 includes similar types of information as the historical data 402, and is gathered in real-time or near-real-time from ongoing communication campaigns. This feedback 404 can include updated customer information, communication details, response rates, engagement metrics, or the like. By incorporating this feedback 404, the model training module 400 can refine and improve the predictive model, improving accuracy and relevancy as new data becomes available.

Within the model training module 400, the operation 406 involves training or updating the model using the historical data 402 and/or feedback 404. This process leverages machine learning algorithms to analyze the input data, identify patterns and trends, and adjust the model parameters accordingly. The trained or updated model is then output to the AI/ML model 210/224/228, which is used in one or more steps of FIGS. 2 and/or 3, such as segmenting communication targets, refining communication parameters, and/or generating communications based on the refined communication parameters. By updating an AI/ML model with new data and feedback, the system ensures that the communication strategies remain effective and adaptive to changing behaviors and preferences of the communication targets.

Training or updating an AI/ML model within the model training module 400 involves ML training techniques. These techniques may include preprocessing, where the historical data 402 and feedback 404 are cleaned, normalized, and/or transformed into a suitable format for training, thereby removing inconsistencies, handling missing values, and/or preparing the data for analysis. In some aspects, training or updating may include feature engineering is also performed during this phase, where new features are created from the existing data. These features may include interaction terms, time-based variables, and/or derived metrics that capture patterns and trends in the data.

Once the historical data 402 and/or feedback 404 is preprocessed, the AI/ML model 210/224/228 is trained. Example ML training techniques include supervised learning, where the AI/ML model 210/224/228 is trained on labeled data with known outcomes, and unsupervised learning, where the AI/ML model 210/224/228 identifies patterns and clusters in unlabeled data. In the context of the AI/ML model 210/224/228 used for communication optimization, supervised learning techniques such as regression, decision trees, and neural networks may be employed. These algorithms learn from the historical data 402 and feedback 404 to predict future behaviors and outcomes. For instance, regression models can predict engagement rates based on various input features, while decision trees and neural networks can capture more complex relationships and interactions within the data.

During the training process, the AI/ML model 210/224/228's performance is evaluated using techniques such as cross-validation or hyperparameter tuning. Cross-validation involves splitting the data into training and validation sets to assess the AI/ML model 210/224/228's accuracy and generalizability. Hyperparameter tuning adjusts the AI/ML model 210/224/228's parameters to improve its performance. Once the AI/ML model 210/224/228 is trained, the AI/ML model 210/224/228 may be validated on a separate test set to test robustness and reliability. The trained AI/ML model 210/224/228 is then deployed to the processing system 200, where the AI/ML model 210/224/228 is used to segment communication targets, refine communication parameters, and/or generate personalized content. By updating the AI/ML model 210/224/228 with new feedback 404, the model training module 400 ensures that the AI/ML model 210/224/228 remains adaptive to changing behaviors and preferences, leading to more effective and efficient communication strategies.

EXAMPLE METHODS

Figure 5:
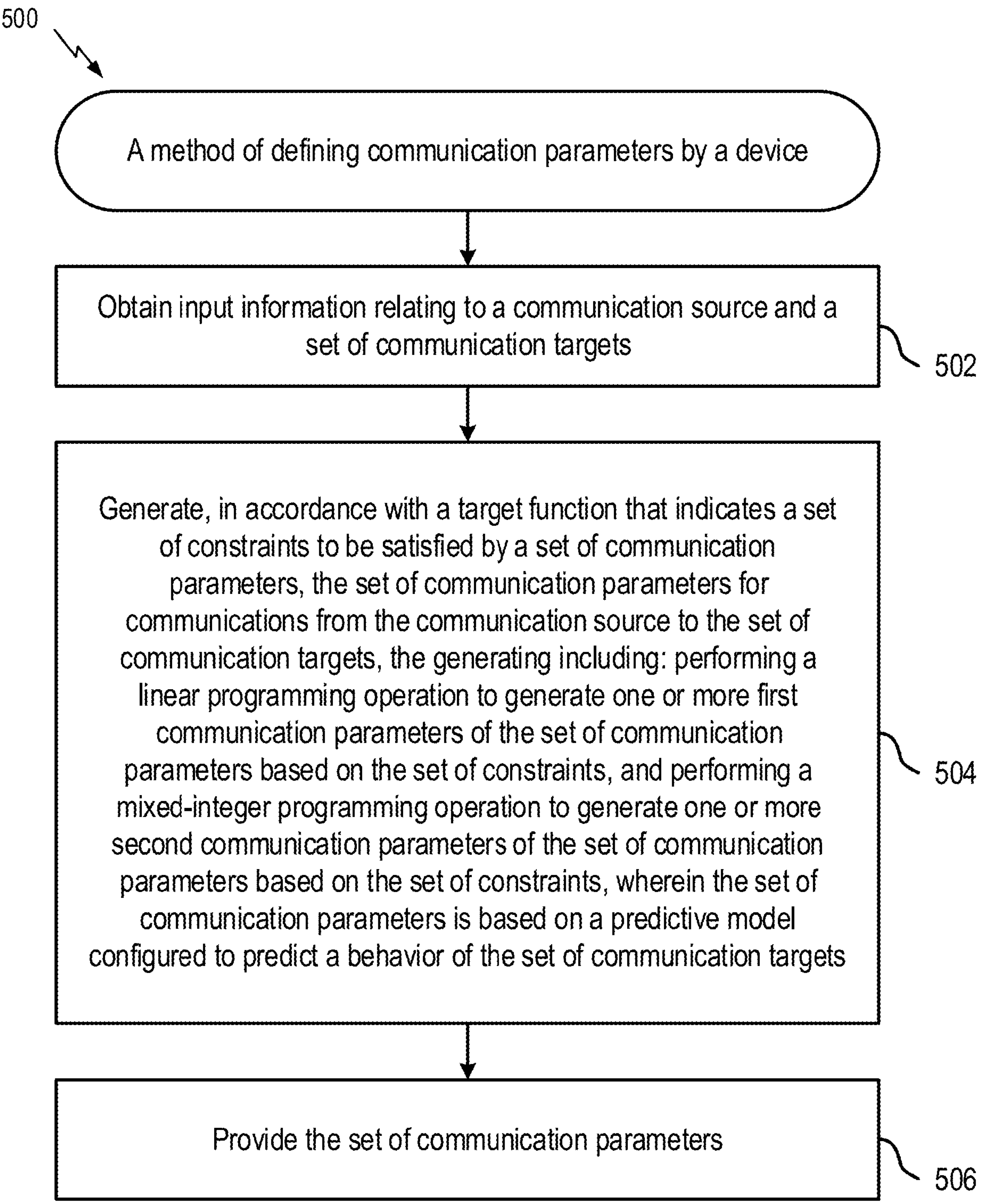
FIG. 5 depicts a method of defining communication parameters.

FIG. 5 depicts an example method 500 for defining communication parameters. In one aspect, method 500 can be implemented by the processing system 200 of FIG. 2 and/or processing system 700 of FIG. 7.

Method 500 begins at block 502 with obtaining input information (e.g., input information 204) relating to a communication source and a set of communication targets.

Method 500 then proceeds to block 504 with generating, in accordance with a target function (e.g., 304) that indicates a set of constraints (e.g., 218) to be satisfied by a set of communication parameters, the set of communication parameters for communications from the communication source to the set of communication targets. The generating includes (1) performing a linear programming operation (such as by linear programming module 214) to generate one or more first communication parameters (e.g., continuous-variable communication parameters 220) of the set of communication parameters based on the set of constraints, and (2) performing a mixed-integer programming operation (such as by mixed-integer programming module 216) to generate one or more second communication parameters (e.g., discrete-variable communication parameters 222) of the set of communication parameters based on the set of constraints, wherein the set of communication parameters is based on a predictive model (e.g., AI/ML model 224) configured to predict a behavior of the set of communication targets.

Method 500 then proceeds to block 506 with providing the set of communication parameters (e.g., at 226 or 230).

In some aspects, the one or more first communication parameters comprise a continuous variable and the one or more second communication parameters comprise a discrete variable.

In some aspects, the set of constraints indicates at least one of: a permitted time parameter for the communications, a maximum number of communications per communication target, or a minimum number of communications per communication target.

In some aspects, the target function is based on at least one of: a relationship between an interaction rate of the set of communication targets and the communications, or minimizing a quantity of the communications.

In some aspects, block 504 includes inputting, to the predictive model, a first output of the linear programming operation or a second output of the mixed-integer programming operation, and the predictive model outputs the set of communication parameters based on the first output or the second output.

In some aspects, the predictive model outputs a modification of the first output or the second output.

In some aspects, the modification is based on the behavior of the set of communication targets.

In some aspects, method 500 further includes obtaining feedback based on the set of communication parameters.

In some aspects, method 500 further includes updating the predictive model using the feedback.

In some aspects, method 500 further includes dividing the set of communication targets into a plurality of groups of communication targets based on the predictive model, wherein the set of communication parameters is based on the plurality of groups of communication targets.

In some aspects, the set of communication parameters comprises a first one or more communication parameters specific to a first group of communication targets of the plurality of groups of communication targets and a second one or more communication parameters specific to a second group of communication targets of the plurality of groups of communication targets.

In some aspects, the first one or more communication parameters comprise at least one of a content of a communication of the communications, a number of communications associated with the first group, or a time associated with the communication.

In some aspects, the input information includes information regarding at least one of: a behavior of the set of communication targets, a preference of the set of communication targets, an engagement metric of the set of communication targets, or a previous interaction by the set of communication targets.

In some aspects, method 500 further includes sending the communications.

In some aspects, method 500 further includes generating content of the communications.

Note that FIG. 5 is just one example of a method, and other methods including fewer, additional, or alternative operations are possible consistent with this disclosure.

Figure 6:
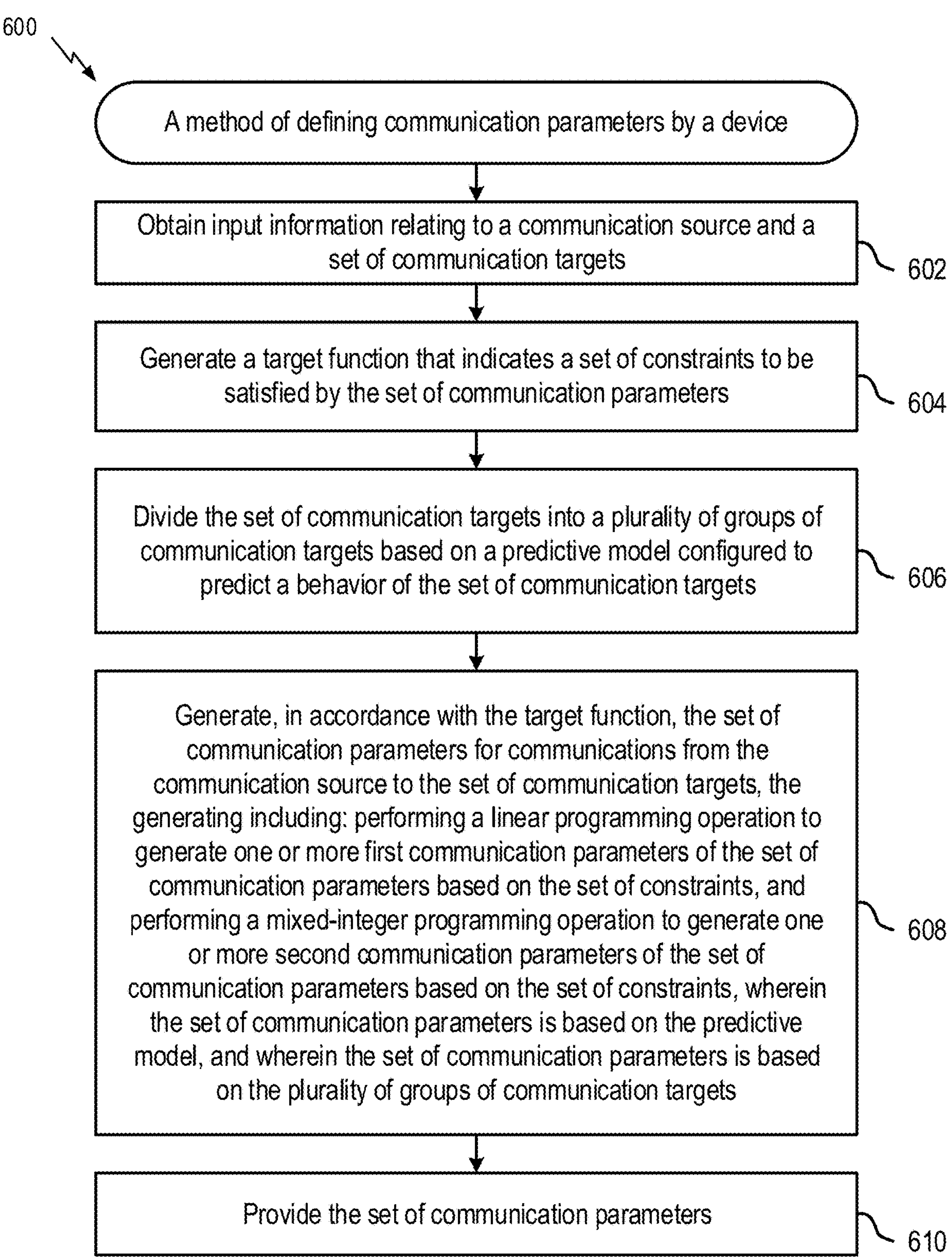
FIG. 6 depicts another method of defining communication parameters.

FIG. 6 depicts an example method 600 for defining communication parameters. In one aspect, method 600 can be implemented by the processing system 200 of FIG. 2 and/or processing system 700 of FIG. 7.

Method 600 begins at block 602 with obtaining input information relating to a communication source and a set of communication targets.

Method 600 then proceeds to block 604 with generating a target function that indicates a set of constraints to be satisfied by the set of communication parameters.

Method 600 then proceeds to block 606 with dividing the set of communication targets into a plurality of groups of communication targets based on a predictive model configured to predict a behavior of the set of communication targets.

Method 600 then proceeds to block 608 with generating, in accordance with the target function, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on the predictive model, and wherein the set of communication parameters is based on the plurality of groups of communication targets.

Method 600 then proceeds to block 610 with providing the set of communication parameters.

In some aspects, method 600 further includes generating content of the communications.

In some aspects, the content is based on an AI/ML model and a group of communication targets of the set of communication targets.

In some aspects, method 600 further includes updating the AI/ML model based on feedback regarding the content or the communications.

In some aspects, method 600 further includes obtaining feedback regarding the set of communication parameters.

In some aspects, method 600 further includes updating the predictive model using the feedback.

In some aspects, updating the predictive model comprises updating the predictive model using an AI/ML algorithm.

In some aspects, the feedback comprises at least one of: first feedback regarding an interaction rate of the set of communication targets and the communications, or second feedback from the set of communication targets.

In some aspects, the set of communication parameters comprises a first one or more communication parameters specific to a first group of communication targets of the plurality of groups of communication targets and a second one or more communication parameters specific to a second group of communication targets of the plurality of groups of communication targets.

In some aspects, the first one or more communication parameters comprise at least one of a content of a communication of the communications, a number of communications associated with the first group, or a time associated with the communication.

Note that FIG. 6 is just one example of a method, and other methods including fewer, additional, or alternative operations are possible consistent with this disclosure.

Figure 7:
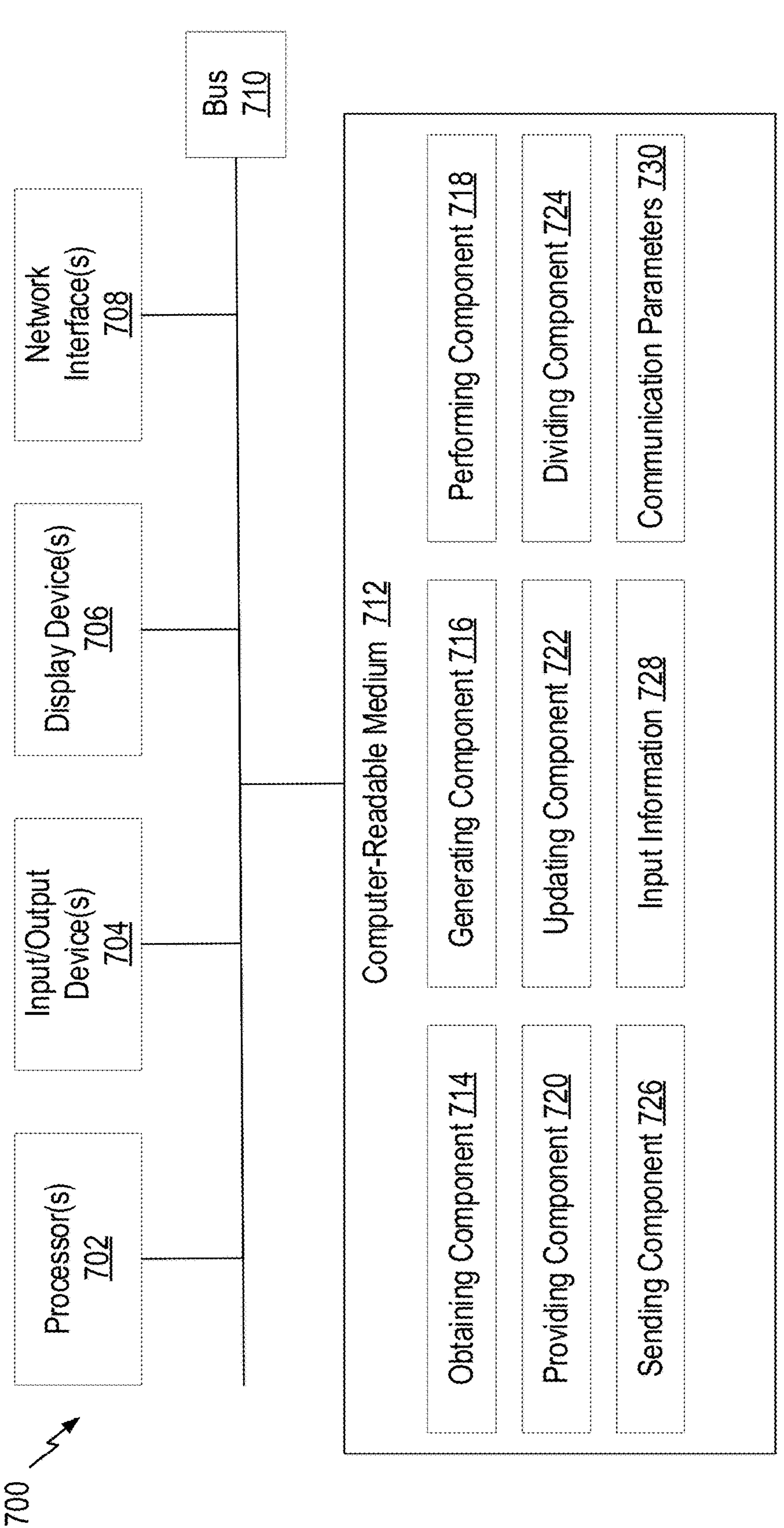
FIG. 7 depicts an example processing system with which aspects of the present disclosure can be performed.

FIG. 7 depicts an example processing system 700 configured to perform various aspects described herein, including, for example, method 500 as described above with respect to FIG. 5 and/or method 600 as described above with respect to FIG. 6.

Processing system 700 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 700 includes one or more processors 702, one or more input/output devices 704, one or more display devices 706, one or more network interfaces 708 through which processing system 700 is connected to one or more networks (e.g., a local network, an intranet, the Internet, or any other group of processing systems communicatively connected to each other), and computer-readable medium 712. In the depicted example, the aforementioned components are coupled by a bus 710, which may generally be configured for data exchange amongst the components. Bus 710 may be representative of multiple buses, while only one is depicted for simplicity.

Processor(s) 702 are generally configured to retrieve and execute instructions stored in one or more memories, including local memories like computer-readable medium 712, as well as remote memories and data stores. Similarly, processor(s) 702 are configured to store application data residing in local memories like the computer-readable medium 712, as well as remote memories and data stores. More generally, bus 710 is configured to transmit programming instructions and application data among the processor(s) 702, display device(s) 706, network interface(s) 708, and/or computer-readable medium 712. In certain embodiments, processor(s)

702 are representative of a one or more central processing units (CPUs), graphics processing unit (GPUs), tensor processing unit (TPUs), accelerators, and other processing devices.

Input/output device(s) 704 may include any device, mechanism, system, interactive display, and/or various other hardware and software components for communicating information between processing system 700 and a user of processing system 700. For example, input/output device(s) 704 may include input hardware, such as a keyboard, touch screen, button, microphone, speaker, and/or other device for receiving inputs from the user and sending outputs to the user.

Display device(s) 706 may generally include any sort of device configured to display data, information, graphics, user interface elements, and the like to a user. For example, display device(s) 706 may include internal and external displays such as an internal display of a tablet computer or an external display for a server computer or a projector. Display device(s) 706 may further include displays for devices, such as augmented, virtual, and/or extended reality devices. In various embodiments, display device(s) 706 may be configured to display a graphical user interface.

Network interface(s) 708 provide processing system 700 with access to external networks and thereby to external processing systems. Network interface(s) 708 can generally be any hardware and/or software capable of transmitting and/or receiving data via a wired or wireless network connection. Accordingly, network interface(s) 708 can include a communication transceiver for sending and/or receiving any wired and/or wireless communication.

Computer-readable medium 712 may be a volatile memory, such as a random access memory (RAM), or a nonvolatile memory, such as nonvolatile random access memory (NVRAM), or the like. In this example, computer-readable medium 712 includes obtaining component 714, generating component 716, performing component 718, providing component 720, updating component 722, dividing component 724, sending component 726, input information 728, and communication parameters 730. Processing of the components 714-726 may enable and cause the processing system 700 to perform the method 500 described with respect to FIG. 5, or any aspect related to it, and/or the method 600 described with respect to FIG. 6, or any aspect related to it.

In certain embodiments, obtaining component 714 is configured to obtain input information 728 relating to a communication source and a set of communication targets (as described with regard to input information 204).

In certain embodiments, generating component 716 is configured to generate, in accordance with a target function that indicates a set of constraints to be satisfied by a set of communication parameters, the set of communication parameters 730 for communications from the communication source to the set of communication targets (as described with regard to step 212 and blocks 504 and 608.

In certain embodiments, performing component 718 is configured to perform a linear programming operation (such as by linear programming module 214) to generate one or more first communication parameters (e.g., 220) of the set of communication parameters 730 based on the set of constraints (e.g., 218). In certain embodiments, performing component 718 is configured to perform a mixed-integer programming operation (such as by mixed-integer programming module 216) to generate one or more second communication parameters (e.g., 222) of the set of communication parameters 730 based on the set of constraints, wherein the set of communication parameters 730 is based on a predictive model (e.g., 224) configured to predict a behavior of the set of communication targets.

In certain embodiments, providing component 720 is configured to provide the set of communication parameters (e.g., at step 230).

In certain embodiments, generating component 716 is configured to generate a target function associated with a set of constraints to be satisfied by the set of communication parameters 730.

In certain embodiments, dividing component 724 is configured to divide the set of communication targets into a plurality of groups of communication targets based on a predictive model configured to predict a behavior of the set of communication targets.

Note that FIG. 7 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method of defining communication parameters by a device, comprising: obtaining input information relating to a communication source and a set of communication targets; generating, in accordance with a target function that indicates a set of constraints to be satisfied by a set of communication parameters, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on a predictive model configured to predict a behavior of the set of communication targets; and providing the set of communication parameters.

Clause 2: The method of Clause 1, wherein the one or more first communication parameters comprise a continuous variable and the one or more second communication parameters comprise a discrete variable.

Clause 3: The method of Clause 2, wherein the set of constraints indicates at least one of: a permitted time parameter for the communications, a maximum number of communications per communication target, or a minimum number of communications per communication target.

Clause 4: The method of any one of Clauses 1-3, wherein the target function is based on at least one of: a relationship between an interaction rate of the set of communication targets and the communications, or minimizing a quantity of the communications.

Clause 5: The method of any one of Clauses 1-4, wherein: generating the set of communication parameters comprises inputting, to the predictive model, a first output of the linear programming operation or a second output of the mixed-integer programming operation, and the predictive model outputs the set of communication parameters based on the first output or the second output.

Clause 6: The method of Clause 5, wherein the predictive model outputs a modification of the first output or the second output.

Clause 7: The method of Clause 6, wherein the modification is based on the behavior of the set of communication targets.

Clause 8: The method of any one of Clauses 1-7, further comprising: obtaining feedback based on the set of communication parameters; and updating the predictive model using the feedback.

Clause 9: The method of any one of Clauses 1-8, further comprising: dividing the set of communication targets into a plurality of groups of communication targets based on the predictive model, wherein the set of communication parameters is based on the plurality of groups of communication targets.

Clause 10: The method of Clause 9, wherein the set of communication parameters comprises a first one or more communication parameters specific to a first group of communication targets of the plurality of groups of communication targets and a second one or more communication parameters specific to a second group of communication targets of the plurality of groups of communication targets.

Clause 11: The method of Clause 10, wherein the first one or more communication parameters comprise at least one of a content of a communication of the communications, a number of communications associated with the first group, or a time associated with the communication.

Clause 12: The method of any one of Clauses 1-11, wherein the input information includes information regarding at least one of: a behavior of the set of communication targets, a preference of the set of communication targets, an engagement metric of the set of communication targets, or a previous interaction by the set of communication targets.

Clause 13: The method of any one of Clauses 1-12, further comprising sending the communications.

Clause 14: The method of any one of Clauses 1-13, further comprising generating content of the communications.

Clause 15: A method of defining communication parameters by a device, comprising: obtaining input information relating to a communication source and a set of communication targets; generating a target function that indicates a set of constraints to be satisfied by the set of communication parameters; dividing the set of communication targets into a plurality of groups of communication targets based on a predictive model configured to predict a behavior of the set of communication targets; generating, in accordance with the target function, the set of communication parameters for communications from the communication source to the set of communication targets, the generating including: performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on the predictive model, and wherein the set of communication parameters is based on the plurality of groups of communication targets; and providing the set of communication parameters.

Clause 16: The method of Clause 15, further comprising generating content of the communications.

Clause 17: The method of Clause 16, wherein the content is based on an AI/ML model and a group of communication targets of the set of communication targets.

Clause 18: The method of Clause 17, further comprising updating the AI/ML model based on feedback regarding the content or the communications.

Clause 19: The method of any one of Clauses 15-18, further comprising: obtaining feedback regarding the set of communication parameters; and updating the predictive model using the feedback.

Clause 20: The method of Clause 19, wherein updating the predictive model comprises updating the predictive model using an AI/ML algorithm.

Clause 21: The method of Clause 19, wherein the feedback comprises at least one of: first feedback regarding an interaction rate of the set of communication targets and the communications, or second feedback from the set of communication targets.

Clause 22: The method of any one of Clauses 15-21, wherein the set of communication parameters comprises a first one or more communication parameters specific to a first group of communication targets of the plurality of groups of communication targets and a second one or more communication parameters specific to a second group of communication targets of the plurality of groups of communication targets.

Clause 23: The method of Clause 22, wherein the first one or more communication parameters comprise at least one of a content of a communication of the communications, a number of communications associated with the first group, or a time associated with the communication.

Clause 24: A processing system, comprising: memory comprising computer-executable instructions; and one or more processors configured to execute the computer-executable instructions and cause the processing system to perform a method in accordance with any one of Clauses 1-23.

Clause 25: A processing system, comprising means for performing a method in accordance with any one of Clauses 1-23.

Clause 26: A non-transitory computer-readable medium storing program code for causing a processing system to perform the steps of any one of Clauses 1-23.

Clause 27: A computer program product embodied on a computer-readable storage medium comprising code for performing a method in accordance with any one of Clauses 1-23.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of defining communication parameters by a device, comprising:

obtaining input information relating to a communication source and a set of communication targets;

generating, in accordance with a target function that indicates a set of constraints to be satisfied by a set of communication parameters, the set of communication parameters for communications from the communication source to the set of communication targets, the generating including:

performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on a predictive model configured to predict a behavior of the set of communication targets; and providing the set of communication parameters.

2. The method of claim 1, wherein the one or more first communication parameters comprise a continuous variable and the one or more second communication parameters comprise a discrete variable.

3. The method of claim 2, wherein the set of constraints indicates at least one of:

a permitted time parameter for the communications, a maximum number of communications per communication target, or a minimum number of communications per communication target.

4. The method of claim 1, wherein the target function is based on at least one of:

a relationship between an interaction rate of the set of communication targets and the communications, or minimizing a quantity of the communications.

5. The method of claim 1, wherein:

generating the set of communication parameters comprises inputting, to the predictive model, a first output of the linear programming operation or a second output of the mixed-integer programming operation, and the predictive model outputs the set of communication parameters based on the first output or the second output.

6. The method of claim 5, wherein the predictive model outputs a modification of the first output or the second output.

7. The method of claim 6, wherein the modification is based on the behavior of the set of communication targets.

8. The method of claim 1, further comprising:

obtaining feedback based on the set of communication parameters; and updating the predictive model using the feedback.

9. The method of claim 1, further comprising:

dividing the set of communication targets into a plurality of groups of communication targets based on the predictive model, wherein the set of communication parameters is based on the plurality of groups of communication targets.

10. The method of claim 9, wherein the set of communication parameters comprises a first one or more communication parameters specific to a first group of communication targets of the plurality of groups of communication targets and a second one or more communication parameters specific to a second group of communication targets of the plurality of groups of communication targets.

11. A method of defining communication parameters by a device, comprising:

obtaining input information relating to a communication source and a set of communication targets;

generating a target function that indicates a set of constraints to be satisfied by a set of communication parameters;

dividing the set of communication targets into a plurality of groups of communication targets based on a predictive model configured to predict a behavior of the set of communication targets;

generating, in accordance with the target function, the set of communication parameters for communications from the communication source to the set of communication targets, the generating including:

performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on the predictive model, and wherein the set of communication parameters is based on the plurality of groups of communication targets; and providing the set of communication parameters.

12. The method of claim 11, further comprising generating content of the communications.

13. The method of claim 12, wherein the content is based on an artificial intelligence or machine learning (AI/ML) model and a group of communication targets of the set of communication targets.

14. The method of claim 13, further comprising updating the AI/ML model based on feedback regarding the content or the communications.

15. The method of claim 11, further comprising:

obtaining feedback regarding the set of communication parameters; and updating the predictive model using the feedback.

16. A processing system, comprising:

one or more memories comprising computer-executable instructions; and one or more processors configured to execute the computer-executable instructions and cause the processing system to:

obtain input information relating to a communication source and a set of communication targets;

generate, in accordance with a target function that indicates a set of constraints to be satisfied by a set of communication parameters, the set of communication parameters for communications from the communication source to the set of communication targets, the generating including:

performing a linear programming operation to generate one or more first communication parameters of the set of communication parameters based on the set of constraints, and performing a mixed-integer programming operation to generate one or more second communication parameters of the set of communication parameters based on the set of constraints, wherein the set of communication parameters is based on a predictive model configured to predict a behavior of the set of communication targets; and provide the set of communication parameters.

17. The processing system of claim 16, wherein the one or more first communication parameters comprise a continuous variable and the one or more second communication parameters comprise a discrete variable.

18. The processing system of claim 17, wherein the set of constraints indicates at least one of:

a permitted time parameter for the communications, a maximum number of communications per communication target, or a minimum number of communications per communication target.

19. The processing system of claim 16, wherein to cause the processing system to generate the set of communication parameters, the one or more processors are configured to cause the processing system to input, to the predictive model, a first output of the linear programming operation or a second output of the mixed-integer programming operation, wherein the predictive model is configured to output the set of communication parameters based on the first output or the second output.

20. The processing system of claim 19, wherein the predictive model is configured to output a modification of the first output or the second output.

* * * * *